United States Patent [19]

Hoffman

[11] Patent Number: 4,867,595
[45] Date of Patent: Sep. 19, 1989

[54] COUPLING METHOD AND APPARATUS FOR USE WITH ROBOTIC DEVICES AND THE LIKE

[75] Inventor: Brian D. Hoffman, Somerville, N.J.

[73] Assignee: Megamation, Incorporated, Princeton, N.J.

[21] Appl. No.: 924,040

[22] Filed: Oct. 28, 1986

[51] Int. Cl.[4] .............................................. B25G 3/00
[52] U.S. Cl. ..................................... 403/13; 403/322; 403/330
[58] Field of Search .................. 403/330, 327, 322, 13

[56] References Cited

U.S. PATENT DOCUMENTS 1,876,103  9/1932  Trogner .............................. 403/330

FOREIGN PATENT DOCUMENTS 69788  9/1958  France .................................. 403/322

OTHER PUBLICATIONS

Brochure entitled Quick Change Adaptors of EOA Systems Inc.
Brochure entitled X Change Model 40 Product Data Sheets of Rotobics.

*Primary Examiner*—Andrew V. Kundrat
*Attorney, Agent, or Firm*—Louis Weinstein

[57] ABSTRACT

The elements making up robotic devices such as the basic robot and driving device, arms, manipulators and the like are coupled together by a novel coupling device, including a coupling device actuator mounted within an element holder for receiving the element and activating the coupling device mounted upon the element typically comprised of a pair of arms spring biased toward a locking position. The element holder is provided with a location for receiving the element and a pair of activating arms which move the locking arms between the locked and unlocked position. The receiving element has a groove for receiving the locking arms and preferably a female socket for receiving a projection on the end of the element having the locking arms. The element to be connected is normally maintained in the holder with the activators energized to retain the locking arms in the open position. The robot is moved to the holder and its element is inserted into the connecting element within the holder. The activating arms are de-energized, releasing the locking arms to enter into the locking groove. The locking arms are retained in this position by biasing springs. The proper orientation of the interconnected elements maybe maintained by the cross-sectional shape of the female socket and cooperating projection, by the arrangement of the locking arm receiving grooves, or both.

31 Claims, 2 Drawing Sheets

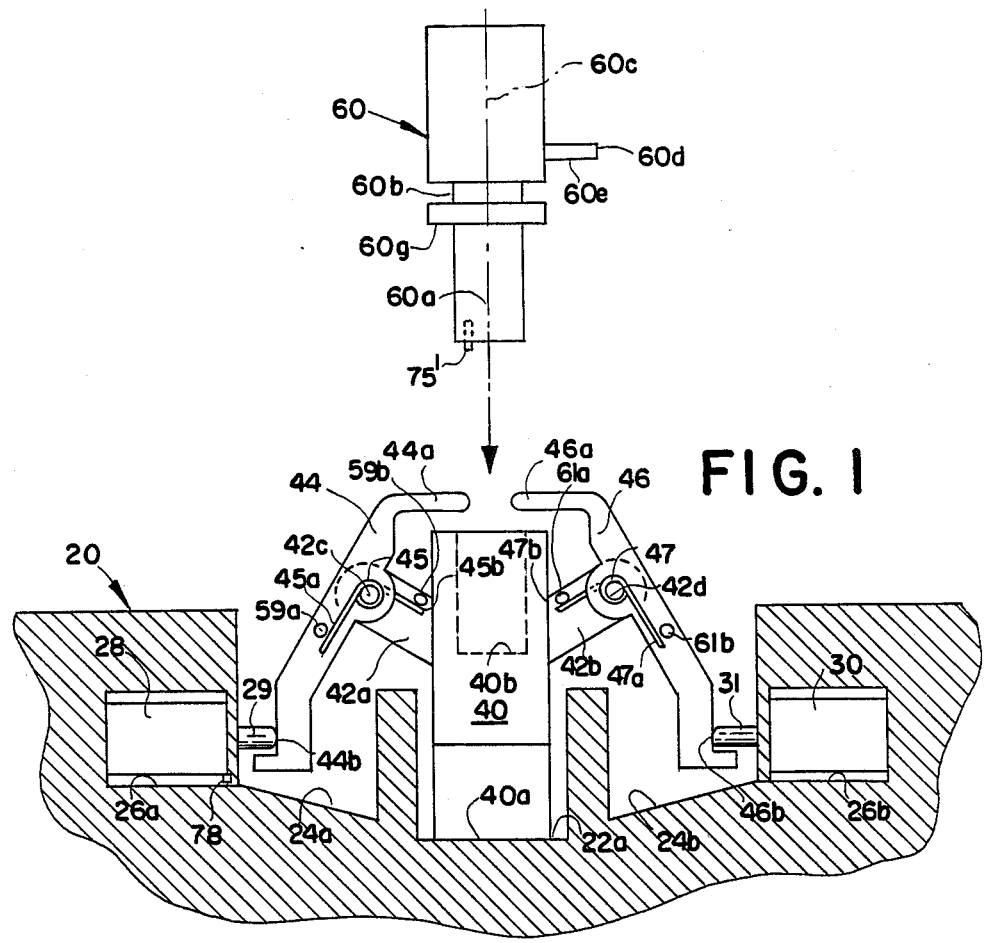
FIG. 1
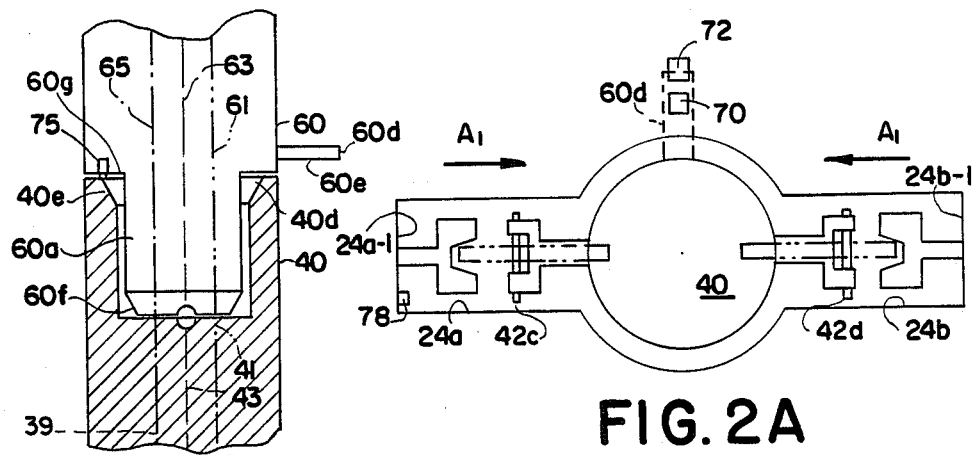
FIG. 2
FIG. 2A

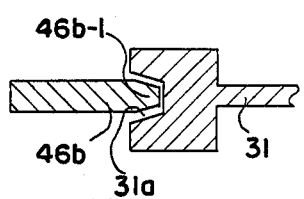
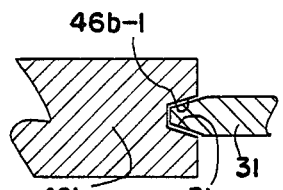
FIG.2B  FIG.2C
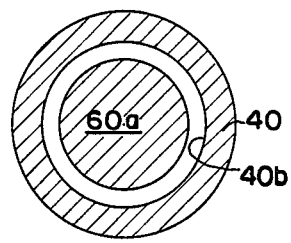 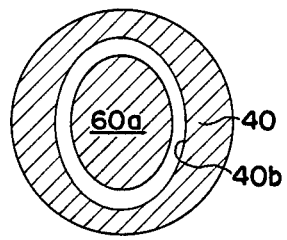 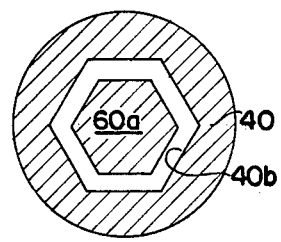
FIG.3A  FIG.3B  FIG.3C
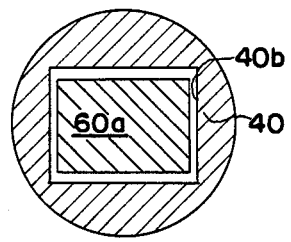 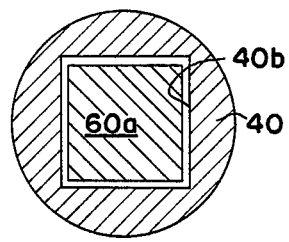 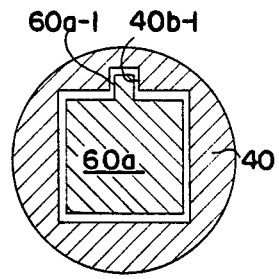
FIG.3D  FIG.3E  FIG.3F
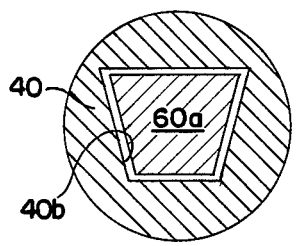 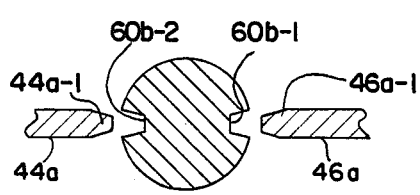
FIG.3G  FIG.4

COUPLING METHOD AND APPARATUS FOR USE WITH ROBOTIC DEVICES AND THE LIKE

FIELD OF THE INVENTION

The present invention relates to robotic devices and the like and more particularly to apparatus for releasably coupling interconnecting elements within a robotics system and whose design reduces the mass and complexity of the system.

BACKGROUND OF THE INVENTION

Robotics systems are being increasingly used for all sorts of manufacturing activities including placement, mounting, interconnection, soldering, heating, and spraying (i.e. painting) and the like for use with all sorts of devices from microcircuitry to large, heavy machinery. Robotics devices typically comprise a linearly movable structure having a plurality of articulated arms which may be swingably moved in a plurality of mutually orthogonal directions. The free end of the outermost arm is typically provided with some form of manipulating or activating device such as a pair of pickup arms, an air jet or paint spraying nozzle, a heating element such as a soldering tip, a rotatable tool such as the tip of a screw driver, and so forth.

To provide robotics system which are flexible and provide a variety of operations with a minimum of robotic devices and interconnecting elements, it is desirable to provide a robotics system with interchangeable elements which may be removed and replaced by other interchangeable elements suitable for the particular job application. The addition of arms, manipulators, coupling elements and the like add both mass and complexity to the robotic devices placing a strain upon both the driving and control mechanisms for the robotic devices.

BRIEF DESCRIPTION OF THE INVENTION

The present invention is characterized by comprising method and apparatus for releasably interconnecting elements of robotic devices wherein both the operating and control mechanisms for interconnection are removed from the robotic device itself, thus reducing both the mass and complexity of the robotic devices and also enhancing operational reliability.

The present invention utilizes releasable couplers provided on one of the elements to be interconnected including a stationary holder for receiving and orienting elements when not in use. The holders further comprise activators for operating the reciprocating locking mechanisms provided on the element within the holder for selectively moving the locking mechanism between the locked and the open position.

Control signals energize deactivating devices to move the locking mechanisms to the open position enabling the element to be interconnected thereto to b moved into the coupling position, whereupon the activating mechanism may then be de-energized to enable the couplings to be released to the control of bias means biasing the coupling members to the locking position.

The coupling members are provided with coupling projections which are received by recesses provided on the element to be interconnected therewith, thereby locking the two elements being interconnected. The locking condition is retained until the element is returned to the holder and deactivating devices are energized to move the locking mechanisms to the open position, whereupon the element moved to the holder may be retracted from the element stored within the holder and thereafter moved to another element for performing a different operation. The locking arms are also capable of being opened manually, if necessary.

The holder is provided with an opening for receiving the stored element and for holding the stored element in the proper orientation for coupling with the element to be interconnected therewith.

One of the interconnected elements may be provided with a socket while the other is provided with a cooperating projection for insertion into the socket. Proper orientation between the connecting elements is assured by providing a socket and cooperating projection of conforming cross-sections. The cross-sections may be circular or non-circular. In the case of circular cross-sections, the orientation between the interconnecting elements may be established by providing discrete recesses at spaced intervals about the element receiving the locking members. As another alternative, the conforming cross-sections of the cooperating projection and projection receiving socket may be non-circular and may be any appropriate shape such as oval, polygonal, square, rectangular or the like. The non-circular conforming cross-sections serve to prevent the interconnected elements from experiencing any relative rotational movement. Such embodiments may be provided with a continuous annular recess provided about the periphery of the element for receiving the locking means. Alternatively, the discrete recesses prevent relative rotation between the interconnected elements, even in the event that the conforming projection and projection receiving socket have conforming circular cross-sections. Sensors may be employed to assure proper orientation.

The interconnectable elements are each preferably provided with a cooperating shoulder such that the interconnecting elements are in proper position when these shoulders are in engagement.

The described arrangement greatly reduces and simplifies the complexity of the robotic device while at the same time retaining the sophistication and capability of the robotic device.

OBJECTS OF THE INVENTION AND BRIEF DESCRIPTION OF THE FIGURES

It is therefore one object of the present invention to provide novel method and apparatus for interconnecting elements employed in robotic devices wherein both the operating and control mechanisms are removed from the robotic devices to significantly reduce both mass and complexity.

Still another object of the present invention is to provide novel method and apparatus for interconnecting elements of robotic devices to interconnecting means of the type described wherein passive means are utilized on the robotic device for retaining the interconnectable elements in the locked position and further including holder means for orienting the element to be so interconnected and further including control and activator means forming part of the holder means for selectively moving the locking mechanisms provided on the element stored within the holder means thereby eliminating the need for such activating mechanisms upon the robotic device.

Still another object of the present invention is to provide passive interlocking means on elements to be interconnected with robotic devices and the like in which cooperating means are provided in the interconnectable elements to properly orient said elements when they are being interconnected.

Still another object of the present invention is to provide novel method and apparatus for selectively locking interconnectable elements of robotic devices and the like wherein the activating means are provided within holder means for holding and orienting the element to be interconnected with the robotic device and wherein the locking means for maintaining the interconnected elements in locking position comprises passive bias means forming part of the robotic device when the elements are interconnected thereby significantly reducing both the mass and control complexity of the robotic device.

Still another object of the present invention is to provide a locking system for interfitted elements of a robotics system in which sensors are employed to ensure the proper orientation and locking of the interfitted elements.

The above, as well as other objects of the present invention, will become apparent when reading the accompanying description and drawing in which:

FIG. 1 shows a simplified plan view, partially sectionalized, of two interconnectable elements and a holder assembly incorporating activating means for selectively moving the locking means provided on one of said interconnectable elements.

FIG. 2 a sectional view of the cooperating cross-sections of the projection and projection receiving socket provided in the interconnected elements.

FIG. 2A is a plan view of the holder of FIG. 1.

FIGS. 2B and 2C show sectional views of other preferred activator arrangements alternative to that shown in FIG. 1.

FIGS. 3A through 3G show sectional views of the conforming cross-sections of the interfitted elements of FIG. 1.

FIG. 4 s an exploded perspective view of the locking ends of locking members and cooperating recesses provided in the element for interconnection with the element having the locking members.

DETAILED DESCRIPTION OF THE INVENTION AND PREFERRED EMBODIMENTS THEREOF

FIG. 1 shows a robotics subsystem comprised of a holder assembly 20 for holding an element assembly 40 for interconnection with an interfitting element assembly 60.

Although not shown for purposes of simplicity, element 60 may be coupled to a robotic device, for example, of the type which is capable of experiencing linear movement in mutually perpendicular directions and which is further capable of moving element 60 at its upper end through mutually perpendicular rotational directions such as, for example, through a universal joint or the like. The lower end of element 60 is provided with an interfitting projection 60a and a locking element receiving recess 60b as shown, for example, in FIG. 1. Element 60 may be provided with lines 61, 63, and 65 which may, for example, respectively provide mechanical, pneumatic and electrical lines for interconnection with like lines 41, 43 and 39 provided in element 40 when they are interfitted in the manner shown in FIG. 2.

Element 40 may, for example, be an intermediate element for connection to a subsequent element or an end type element for performing an operation such as manipulation (i.e. picking up and dropping off), heating, spraying or other like pressurizing operation or for a mechanical rotational operation such as rotating the tip of a screw driver, socket wrench or other similar tool.

Element 40 may be an intermediate element such as a universal joint for providing the robotic device with an additional swingable operation wherein still another element may be connected to intermediate element 40 and electrically, mechanically or pneumatically powered by one of the lines 41, 43, 39.

Element 40 is provided with an end 40a which may be the manipulator end for holding (and/or releasing), heating, spraying or other like operations. A pair of arms 42, 42b are provided on element 40 near the upper end thereof and swingably mount a pair of locking arms 44, 46 respectively by means of pins 42c, 42d. Arms 44, 46 are each provided with a locking projection 44a, 46a at their upper ends and with an activating portion 44b, 46b at their lower ends. A torsion spring 45, 47 is arranged about each pin 42c, 42d, the ends 45a, 45b, and 47a, 47b engage pins 59, 59b and 61a, 61b to normally respectively urge arms 44 and 46 clockwise and counter clockwise about the pins 42c, 42d.

Holder 20 is provided with a central cavity 22 (note also FIG. 2A) for receiving the main body of element 40 and is provided with communicating cavity portions 24a, 24b for respectively receiving the locking arms 44, 46 and the activating pins 29, 31 of activating devices 28, 30 which are arranged within cavities 26a and 26b of holder 20. Activating devices 28 and 30 may, for example, be electric relays which operate activating pins 29 and 31 coupled to the armatures of relays 28 and 30. The free ends of activating pins 29 and 31 respectively engage surfaces 44b, 46b of arms 44 and 46 for selectively moving the arms 44 and 46 between the locking and unlocking positions. The devices 28 and 30 may be operated by mechanical or pneumatic means, if desired.

The free ends of the activators may be tapered to guidingly receive the similarly tapered edge of the locking arm. For example, note FIG. 2B which shows the activating pin 31 having a tapered slot 31a for receiving the tapered portion 46b-1 of the surface 46b of arm 46. Activator pin 29 and surface 44b of arm 44 may be arranged in a similar fashion.

As another alternative arrangement, see FIG. 2C, activator pin 31 may be provided with a tapered end 31a adapted to be guidingly received within the tapered slot 46b-1 of the lower end 46b of locking arm 46. If desired, slot 46b-1 shown in FIG. 2C may be an elongated slot or a circular slot for respectively receiving either an elongated tapered portion 31a or a truncated conical-shaped portion 31a of activator pin 31. If desired, other alternative arrangements may be employed.

The central cavity is preferably designed so that the lower end 40a of element 40 engages surface -. 22a to properly position the surfaces 44b, 46b of arms 44 and 46 for respective engagement by the ends of activator pins 29 and 31.

Elements 40 and 60 may be interengaged and locked by moving element 60, which was previously connected to the robotic device by means not shown, into axial alignment with element 40.

Member 60 is then moved downwardly so that its projecting portion 60a is inserted into the cavity 40b provided in element 40. The projection 60a has a cross-section which preferably conforms to the cross-section of opening 40b. As shown in FIG. 3A, the conforming cross-sections may be circular or may be non-circular such as oval shown in FIG. 3B, polygonal shown in FIG. 3C, rectangular shown in FIG. 3D, or square shown in FIG. 3E. The interlocking arrangement may be comprised of a continuous groove 60b provided in member 60 for receiving the projections 44a, 46a (FIG. 1) or alternatively may be comprised of a pair of locking slots 60b-1, 60b-2 arranged diametrically opposed to one another and adapted, respectively receive the tapered tips 46a-1, 44a-1 provided at the free ends of projections 46a, 44a (FIG. 4).

The projection arrangement of either FIG. 1 or FIG. 4 may be employed with any of the cross-sectional arrangements shown in FIG. 3A through FIG. 3E. The robotics device to which element 60 is coupled may be provided with rotational means for rotating element 60 about its longitudinal axis 60c in order to be assured that element 60 is properly aligned with element 40 to assure that the proper interconnections be made, for example, between the lines 61, 63, 65 and 41, 43, 39 as shown in FIG. 2. This may accomplished in a variety of ways such as, for example, by providing a projection 60a-1 and a cooperating recess 40b-1 to permit the of members 40 and 60 in only one orientation, as shown in FIG. 3F, or the conforming cross-sections may be irregular, such as the trapezoidal shape shown in FIG. 3G. Alternatively, a projection 60d may be provided on element 60 having a reflective surface 60e for cooperation with a light source 70 and a sensor 72 where light source 70 may emit light of a predetermined wavelength and sensor 72 may detect the presence of only light of said predetermined wavelength which occurs only when the reflective surface 60d is properly positioned over the elements 70 and 72. The inclination of reflector surface 60e may be such as to assure that light emitted from source 70 will be reflected at an angle appropriate to be received by sensor 72.

Returning to a consideration of the interlocking steps, relays 28 and 30 are energized to urge activator pins 29 and 31 in the direction of arrows A-1, A-1 shown in FIG. 2A to urge the bottom ends of locking arms 44 and 46 inwardly thereby urging the projections 44a and 46a outwardly. Element 60 is then moved into alignment with element 40 and is lowered into element 40 so that projection 60a enters, into recess 40b. The top portion of recess 40b may be provided with a bevel or taper as shown at 40d and the lower end of projection 60a may be bevelled or tapered as shown at 60f in order to aid in the insertion of projection 60a into recess 40b. The element 60 is preferably properly positioned within the element 40 when shoulders 60g and 40e are in engagement. A sensor 75 may be provided along shoulder 60g and mechanically, electrically, optically or pneumatically connected to the robotics device to indicate when the elements are in proper position (FIG. 2) or alternatively provided at the end of projection 60a as at 75'.

Alternatively, and to simplify the mass and complexity of the robotic device, a sensor 78 may be provided in side wall 24a-1 which is engageable by the free end of arm 44 when relay devices 28 and 30 are de-energized (FIG. 1). Sensor 78 is preferably arranged to-be engaged by arm 44 only when its projection 44a is properly entered into locking recess 60b, thereby assuring proper interlocking between elements 40 and 60. In the event of improper interlocking, the lower end of arm 44 will not swing out sufficiently to activate sensor 78, which may be of the optical, magnetic, pneumatic, mechanical, or other type sensor.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention here.

What is claimed is:

1. Means releasably interconnecting first and second elements comprising:

a pair of couplers pivotally mounted to one of said elements and each having a coupling end and an activating end;

the remaining one of said elements having coupling receiving means for receiving said couplers;

bias means on said one element for normally urging said couplers toward the locked position;

a holder for said one element orienting said one element for coupling with the end of said remaining one of said elements;

said holder including a cavity for releasably receiving said one element and adjacent recesses for receiving said couplers;

activators arranged in said holder adjacent to said activating ends and having reciprocating members movable between a first position for opening said couplers and a second position releasing said couplers, enabling said bias means to urge said couplers to the locked position whereby said one element may be lifted from said holder by said remaining element.

2. The interconnecting means of claim 1 wherein said activators comprise relay operating means having an armature coupled to each activator.

3. The interconnecting means of claim 2 wherein said activators are linearly movable.

4. The interconnecting means of claim 1 wherein said couplers each comprise an arm having a locking end having an inwardly directed projection;

said remaining one of said elements having recesses near one end thereof for receiving one of said projections.

5. The interconnecting means of claim 4 wherein said recesses extend along the surface of said element and lie along an imaginary line passing through the center of said remaining one of said elements.

6. The interconnecting means of claim 4 wherein said recesses extend around the surface of said remaining one of said elements.

7. The interconnecting means of claim 4 wherein said one of said elements has a receiving socket at the end thereof and said remaining one of said elements has a projection at the end thereof adjacent to said coupling end and adapted for insertion into said socket.

8. The interconnecting means of claim 7 wherein said one of said elements has a shoulder and said remaining one of said elements has a shoulder, said former and latter shoulders cooperating to properly locate the elements being interconnected when said shoulders are in engagement.

9. The interconnecting means of claim 7 wherein the cross-section of said projection conforms to the cross-section of said socket.

10. The interconnecting means of claim 9 wherein said cross-sections are substantially circular.

11. The interconnecting means of claim 9 wherein said cross-sections are substantially non-circular.

12. The interconnecting means of claim 11 wherein said cross-sections are polygonal shaped.

13. The interconnecting means of claim 12 wherein said cross-sections are square shaped.

14. The interconnecting means of claim 12 wherein said cross-sections are rectangular shaped.

15. The interconnecting means of claim 12 wherein said cross-sections are trapezoidal-shaped.

16. The interconnecting means of claim 1 wherein said bias means comprises resilient spring means.

17. The interconnecting means of claim 16 wherein said spring means comprises torsion spring means.

18. The interconnecting means of claim 16 wherein each of said coupling means comprises an arm pivotally connected to said element and has a first end provided with an integral projection arranged to extend into the receiving recess provided in the element to be coupled to the element having said coupling means.

19. The interconnecting means of claim 18 wherein the end of said arm opposite said projection is arranged to be engaged by said activatorg means when the element supporting the coupling means is positioned in said element holder.

20. The interconnecting means of claim 19 wherein the actuator means is provided with an arm having a tapered slot for receiving and centering the end of the arm engaging the locking means arm.

21. The interconnecting means of claim 20 wherein the portion of said arm engaging said slot is tapered.

22. The interconnecting. means of claim 19 wherein the actuator means is provided with an arm having a tapered projection for centering the end of the activating means engaging a slot in the locking means arm.

23. The interconnecting means of claim 22 wherein the slot in said arm engaging said projection is tapered.

24. A method for interconnecting two elements in a robotics system said elements having interfitted end portions which engage one another when the elements are joined together; one of said elements having a pair of swingably mounted locking arms and means for biasing the locking arms toward a closed position;

said arms having locking projections and activating portions at spaced locations therealong; the remaining one of said elements having recesses for receiving the locking projections and a holder for holding said one element so that it is positioned to receive the interengaging end of said remaining element, said elements having interengaging surfaces which are adapted to contact one another when the elements are properly interfitted, said method comprising the steps of:

(a) moving said remaining element towards said holder and with the interengaging surfaces in contact to bring the elements into interfitting engagement while holding the locking arms open;

(b) releasing the locking arms under control of their bias means to enable movement of the locking arm projections into the projection receiving recesses; and (c) moving said remaining element in the reverse direction to remove the said one element and its locking arms from said holder.

25. The method of claim 24 wherein the interfitted portions of said elements have conforming cross-sections; and step (a) further includes the step of orienting remaining elements to bring the conforming cross-sections into alignment.

26. The method of claim 25 wherein said conforming cross-sections are non-circular and wherein the orienting step comprises rotating said element.

27. The method of claim 26 wherein the rotating of said remaining element includes selectively rotating said remaining element in a plurality of mutually perpendicular axes.

28. The interfitting apparatus of claim 1 further comprising sensor means for sensing a portion of one of said elements to indicate proper alignment of said elements.

29. The apparatus of claim 28 wherein said sensor means detects the release of one of said locking arms.

30. The apparatus of claim 29 wherein said sensor means is positioned in said holder.

31. The apparatus of claim 28 wherein the sensor means is arranged in one of said elements for detecting engagement of said elements.

* * * * *